(12) United States Patent
Iwahara et al.

(10) Patent No.: US 8,918,964 B2
(45) Date of Patent: Dec. 30, 2014

(54) FASTENER

(75) Inventors: Toshio Iwahara, Okazaki (JP); Osamu Asai, Okazaki (JP)

(73) Assignee: Daiwa Kasei Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/330,050

(22) Filed: Dec. 19, 2011

(65) Prior Publication Data
US 2012/0159742 A1 Jun. 28, 2012

(30) Foreign Application Priority Data

Dec. 27, 2010 (JP) ................. 2010-290021

(51) Int. Cl.
B65D 63/10 (2006.01)
B60R 16/02 (2006.01)
F16L 3/233 (2006.01)
H02G 3/32 (2006.01)

(52) U.S. Cl.
CPC ........... B60R 16/0215 (2013.01); F16L 3/2334 (2013.01); H02G 3/32 (2013.01)
USPC ...................... 24/16 PB; 24/17 AP

(58) Field of Classification Search
USPC ............... 24/16 PB, 16 R, 17 R, 17 A, 17 AP
See application file for complete search history.

(56) References Cited

U.S. PATENT DOCUMENTS

| 4,735,387 | A | * | 4/1988 | Hirano et al. ................... 248/71 |
| 6,745,439 | B2 | * | 6/2004 | Brownlee et al. ........... 24/16 PB |
| 7,316,375 | B2 | * | 1/2008 | Wakabayashi et al. ......... 248/71 |
| 2008/0164383 | A1 | | 7/2008 | Gunzburger |
| 2009/0293234 | A1 | * | 12/2009 | Chang et al. ................ 24/16 PB |

FOREIGN PATENT DOCUMENTS

| EP | 0 611 038 A1 | 8/1994 |
| EP | 1 211 187 A1 | 6/2002 |
| EP | 1 619 081 A1 | 1/2006 |
| JP | 4-82407 U | 7/1992 |
| JP | 2003-028111 | 1/2003 |

* cited by examiner

*Primary Examiner* — Robert J Sandy
*Assistant Examiner* — Abigail Morrell
(74) *Attorney, Agent, or Firm* — Christensen Fonder PA

(57) ABSTRACT

A fastener may include a belt, a buckle connected to the belt and having an inlet end and an outlet end, and a pair of protection portions formed in the outlet end of the buckle. The belt and the buckle are arranged and constructed to be locked to each other when the belt is tightened after the belt is inserted into the buckle and drawn therefrom. The protection portions are arranged and constructed to respectively face longitudinal peripheries edges of the belt that is inserted into the buckle and drawn therefrom. Each of the protection portions has a projection amount not less than a length of a remaining portion of the belt, which portion can be produced by cutting off an excess portion of the belt drawn from the buckle.

4 Claims, 5 Drawing Sheets

FASTENER

BACKGROUND OF THE INVENTION

1. Field of the Invention

The present invention relates to a fastener (belt clamp) for clamping or binding an attached article (e.g., a wiring harness) in order to attach the same to a subject member (e.g. a body panel) of a vehicle.

2. Description of Related Art

A known fastener is taught by, for example, Japanese Laid-Open Patent Publication No. 2003-28111. The known fastener includes a belt (holding member) that can hold a wiring harness, and a buckle integrally connected to the belt. The belt has a plurality of engagement teeth that are longitudinally formed therein in series. Conversely, the buckle has an insertion hole into which the belt is inserted, and an engagement strip that is capable of engaging the engagement teeth of the belt when the belt is inserted into the insertion hole.

In order to clamp the wiring harness, the belt is wrapped around the wiring harness. Thereafter, a leading end of the wrapped belt is inserted into the insertion hole of the buckle and is then drawn from the buckle. Thereafter, the belt is tightened by pulling the leading end thereof drawn from the buckle. At this time, the engagement teeth of the belt can automatically engage the engagement strip of the buckle, so that the belt can be locked or secured to the buckle while the belt is fastened around the wiring harness. Thus, the wiring harness can be clamped by the fastened belt and the buckle.

Generally, an excess portion of the belt that is drawn from the buckle may preferably be cut off leaving a desired length of remaining portion. The excess portion of the belt can be cut off manually or by machine. However, after the excess portion is removed, a remaining portion can still exist afterwards. The remaining portion necessarily has a sharp cut end. Such a sharp cut end of the belt may cause injuries to the hands of workers.

Thus, there is a need in the art for improved fasteners.

SUMMARY OF THE INVENTION

For example, in one embodiment of the present invention, a fastener may include a belt, a buckle connected to the belt and having an inlet end and an outlet end, and a pair of protection portions formed in the outlet end of the buckle. The belt and the buckle are arranged and constructed to be locked to each other when the belt is tightened after the belt is inserted into the buckle and drawn therefrom. The protection portions are arranged and constructed to respectively face longitudinal peripheries of the belt that is inserted into the buckle and drawn therefrom. Each of the protection portions has a projection amount not less than a length of a remaining portion of the belt, which portion can be produced by cutting off an excess portion of the belt drawn from the buckle.

According to the fastener of the present invention, a cut end of the remaining portion of the belt can be effectively covered by the protection portions from both sides thereof. Therefore, a worker can be effectively protected from being injured by the cut end of the belt.

Additional objects, features and advantages of the present invention will be readily understood after reading the following detailed description together with the accompanying drawings and the claims.

DETAILED DESCRIPTION OF THE INVENTION

Figure 1:
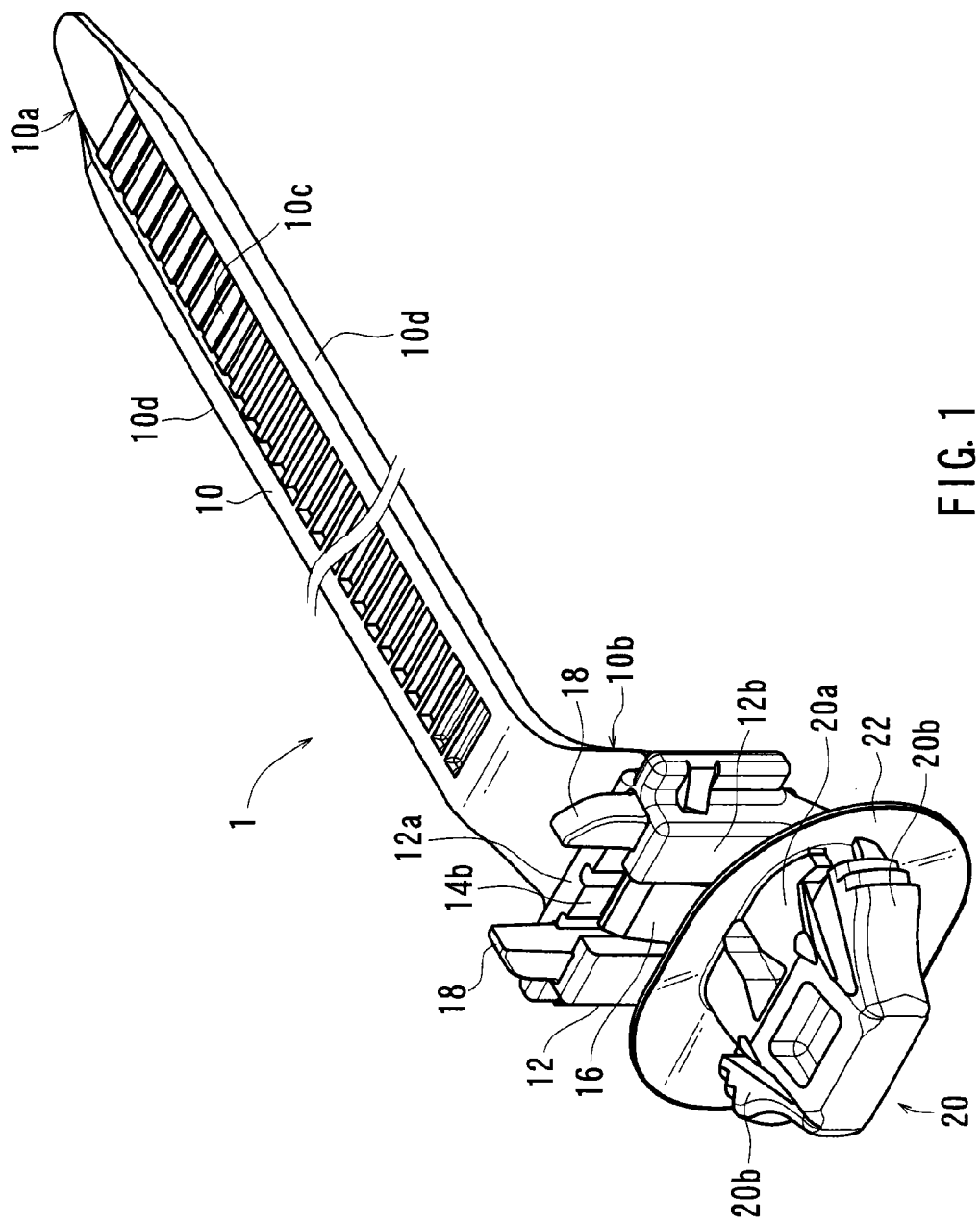
FIG. 1 is a perspective view of a fastener according to a first representative embodiment of the present invention.

Detailed representative embodiments of the present invention are shown in FIG. 1 to FIG. 7.

First Embodiment

A first embodiment of the present invention will be described in detail with reference to FIGS. 1 to 5.

As shown in FIGS. 1 to 5, a fastener (belt clamp) 1 may be integrally formed as a unit or one piece by integral molding of a resin. The fastener 1 may include a holding member or belt (tying belt) 10 that can hold a wiring harness W (i.e., an attached article), a buckle 12 integrally connected to the belt 10, and an engagement leg or anchor 20 integrally connected to the buckle 12. The belt 10 may preferably have a plurality of engagement teeth 10c that are longitudinally formed therein in series. The buckle 12 may preferably have an insertion hole 14 into which the belt 10 is inserted, and an engagement strip 16 that is capable of engaging the engagement teeth 10c of the belt 10 when the belt 10 is inserted into the insertion hole 14. The anchor 20 may be configured to be inserted into an elongated attaching hole (not shown) formed in a body panel (i.e., an attaching object) of a vehicle (not shown).

Figure 5:
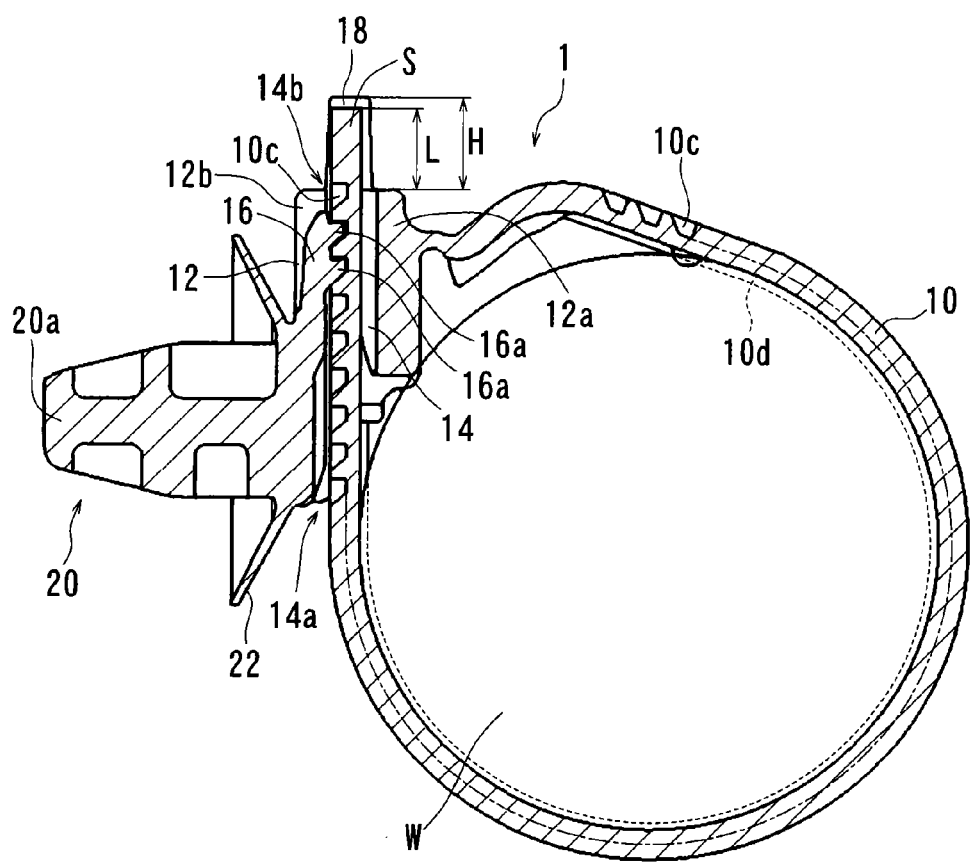
FIG. 5 is a cross-sectional view of the fastener, which illustrates a condition in which a wiring harness is clamped.

In order to clamp the wiring harness W, the belt 10 may be wrapped around the wiring harness W. Thereafter, a leading end of the wrapped belt 10 may be inserted into the insertion hole 14 of the buckle 12 and may then be drawn from the buckle 12. Subsequently, the belt 10 may be tightened by pulling the leading end thereof drawn from the buckle 12. At this time, the engagement teeth 10c of the belt 10 may automatically engage the engagement strip 16 formed in the buckle 12, so that the belt 10 can be locked or secured to the buckle 12 while the belt 10 is fastened around the wiring harness W. Thus, the wiring harness W may be clamped by the belt 10 and the buckle 12 of the fastener 1 (FIG. 5). After the wiring harness W is clamped, an excess portion of the belt 10 that is drawn from the buckle 12 may preferably be cut off leaving a desired length of remaining portion S. Thereafter, the anchor 20 may be inserted into the attaching hole formed in the body panel of the vehicle. Thus, the clamped wiring harness W may be attached to the body panel of the vehicle.

Next, the belt 10 will be described in detail. The belt 10 may be an elongated plate-shaped member having a substantially constant width over its entire length thereof. The belt 10 may have a distal end 10a (a free end) and a proximal end 10b that is integrally connected to the buckle 12. The engagement teeth 10c may be formed in one surface (an upper surface in FIGS. 1 and 2, which surface may be referred to as an outer surface) of the belt 10. The engagement teeth 10c may be formed in the belt 10 at a constant pitch distance. Further, the belt 10 may have ribs 10d (FIG. 5) that are longitudinally formed therein. The ribs 10d may be formed in the other surface (an lower surface in FIGS. 1 and 2, which surface may be referred to as an inner surface) of the belt 10, so that the clamped wiring harness W can be effectively prevented from being slid longitudinally relative to the belt 10.

Figure 2:
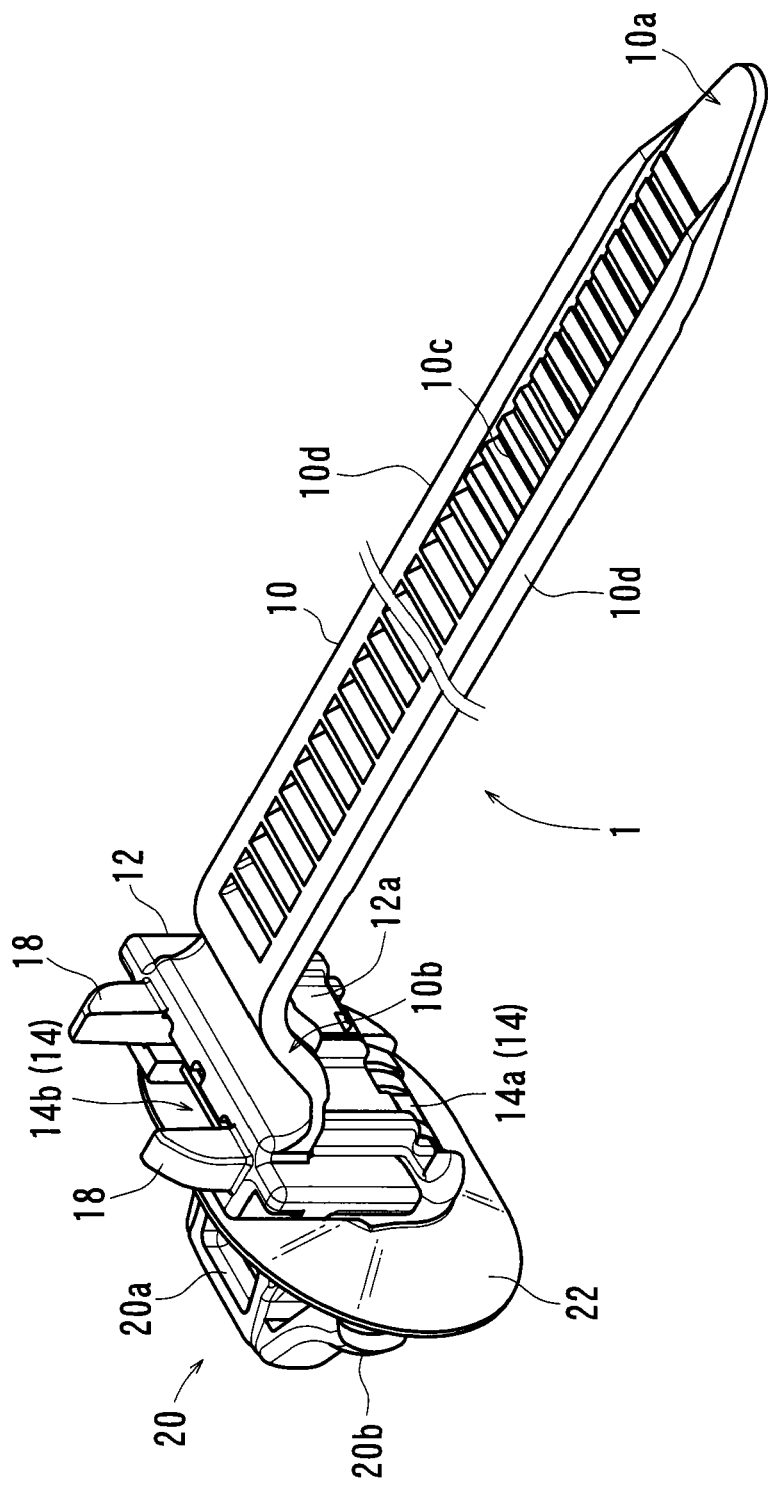
FIG. 2 is a perspective view of the fastener, which is viewed from a direction different from FIG. 1.
Figure 3:
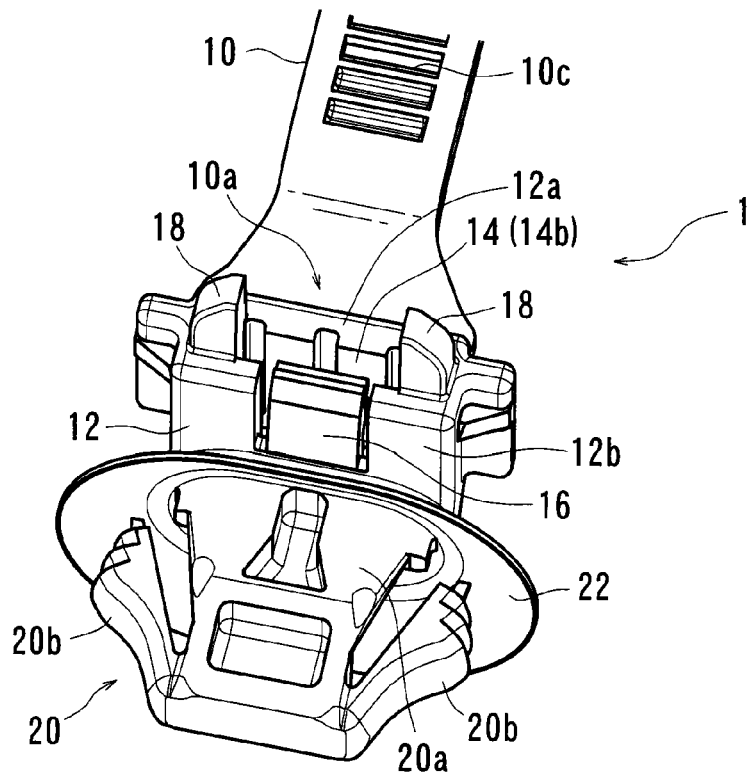
FIG. 3 is a partially enlarged perspective view of the fastener.

Next, the buckle 12 will be described in detail. The buckle 12 may be an open-ended box-shaped member in which the insertion hole 14 is formed. The buckle 12 may have an inlet end 14a and an outlet end 14b, so that the belt 10 can be inserted into the insertion hole 14 from the inlet end 14a toward the outlet end 14b (FIGS. 2 and 5). Further, the buckle 12 may preferably have one side wall (a back side wall 12a) to which the proximal end 10b of the belt 10 is connected, and the other side wall (a front side wall 12b). Further, as shown in FIGS. 1 and 3, the engagement strip 16 may be formed in the front side wall 12b of the buckle 12 by partially removing the same, so as to be flexed toward and away from the insertion hole 14. The engagement strip 16 may have a plurality of (two in this embodiment) engagement projections 16a that are projected into the insertion hole 14, so as to mesh with the engagement teeth 10c formed in the belt 10 (FIG. 5) when the belt 10 is inserted into the insertion hole 14. Further, the engagement projections 16a of the engagement strip 16 and the engagement teeth 10c of the belt 10 may respectively be specially shaped such that the belt 10 cannot be easily drawn back from the insertion hole 14 once the engagement projections 16a mesh with the engagement teeth 10c. That is, the engagement projections 16a of the engagement strip 16 and the engagement teeth 10c of the belt 10 may respectively be shaped to provide a detent or self-locking function to the belt 10.

Figure 4:
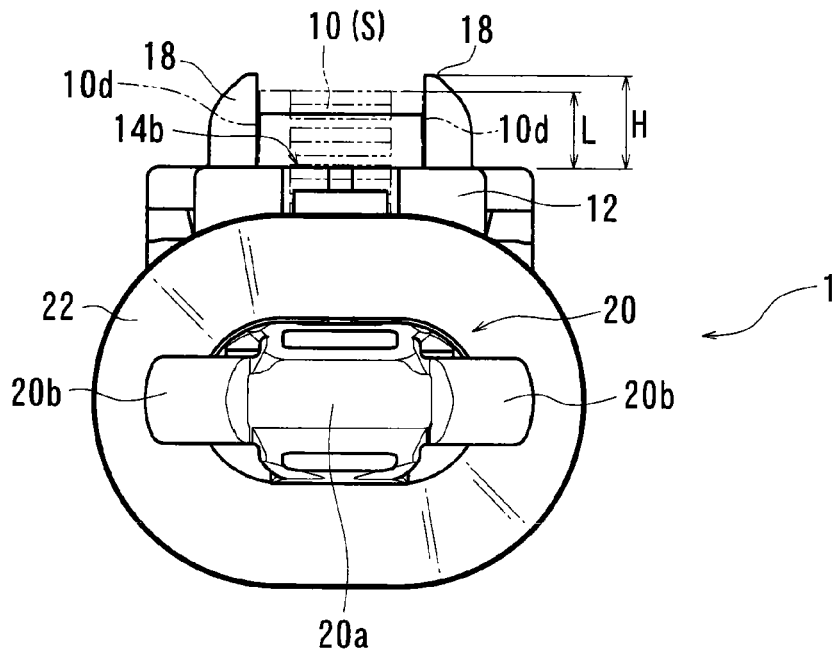
FIG. 4 is an elevational view of a buckle of the fastener.

Further, the buckle 12 may have a pair of protection portions 18 that are integrally formed in the outlet end 14b thereof. The protection portions 18 are laterally and opposite to each other across the insertion hole 14 and are projected outwardly (upwardly in FIGS. 1 to 5) from the outlet end 14b. Further, as best shown in FIG. 4, the protection portions 18 may be arranged and constructed to respectively face longitudinal peripheries 10d (widthwise edges) of the belt 10 that is inserted into the insertion hole 14 from the inlet end 14a and drawn from the outlet end 14b, so as to guide the belt 10 from both lateral sides. Further, as best shown in FIG. 4, each of the protection portions 18 may preferably be shaped to have a height (projection amount) H not less than a length L of the remaining portion S. In addition, each of the protection portions 18 may preferably be shaped to have a smooth rounded surface, so as to not injure hands of a worker.

The anchor 20 may be integrally connected to the front side wall 12b of the buckle 12 with interleaving a dish-shaped stabilizer 22. As shown in FIGS. 1 and 3, the anchor 20 includes a pillar 20a that is projected outwardly from the stabilizer 22, and a pair of (right and left) flexible strips 20b that are respectively connected to a distal end of the pillar 20a. In particular, the flexible strips 20b are respectively projected obliquely backward (toward the stabilizer 22) and outward from the distal end of the pillar 20a. That is, the flexible strips 20b may respectively be formed as cantilevered strips each of which has a proximal end integrated with the distal end of the pillar 20a and a distal end (a free end). Therefore, each of the flexible strips 20b can flex inward and outward relative to the pillar 20a about the proximal end thereof.

Next, a method of using the fastener 1 will now be described in detail.

First, the belt 10 is wrapped around the wiring harness W. Thereafter, the leading end (the distal end 10a) of the wrapped belt 10 may be inserted into the insertion hole 14 of the buckle 12 from the inlet end 14a toward the outlet end 14b (FIG. 5) and may then be drawn from the buckle 12 via the outlet end 14b. Subsequently, the inserted belt 10 may be tightened by pulling the distal end 10a thereof drawn from the buckle 12.

At this time, the belt 10 can move within the insertion hole 14 from the inlet end 14a toward the outlet end 14b while the engagement teeth 10c formed therein intermittently click against the engagement projections 16a of the engagement strip 16. Upon completion of a tightening operation of the belt 10, the engagement teeth 10c of the belt 10 can automatically engage the engagement projections 16a of the engagement strip 16, so that the belt 10 can be locked or secured to the buckle 12 while the belt 10 is fastened around the wiring harness W. Thus, the wiring harness W can be clamped by the fastener 1 (FIG. 5).

As previously described, after the wiring harness W is clamped, the excess portion of the belt 10 drawn from the outlet end 14b of the buckle 12 may preferably be cut off leaving the remaining portion S.

Subsequently, the anchor 20 of the fastener 1 is inserted into the attaching hole formed in the body panel of the vehicle. Upon insertion of the anchor 20 into the attaching hole, the anchor 20 may pass through the attaching hole while the flexible strips 20b are respectively flexed inward about the proximal end thereof. When the anchor 20 is completely inserted into the attaching hole, the flexible strips 20b may respectively be restored outward, so as to engage a periphery of the attaching hole. Thus, the anchor 20 and thus corresponding the fastener 1 can be secured to the body panel. As a result, the wiring harness W can be attached to the body panel via the fastener 1. Further, when the anchor 20 is completely inserted into the attaching hole, the stabilizer 22 can be elastically pressed against the body panel. Therefore, the anchor 20 can be stabilized by the stabilizer 22. In addition, the attaching hole can be reliably closed or sealed by the stabilizer 22.

According to the fastener 1 of the present embodiment, the protection portions 18 are formed in the buckle 12. Further, each of the protection portions 18 has the height H not less than the length L of the remaining portion S that can be produced by cutting off the excess portion of the belt 10 drawn from the buckle 12 after the wiring harness W is clamped by the belt 10. Therefore, a cut end of the remaining portion of the belt 10 can be effectively covered by the protection portions 18 from both sides thereof. As a result, the worker can be effectively protected from being injured by the cut end of the belt 10.

Second Embodiment

Figure 6:
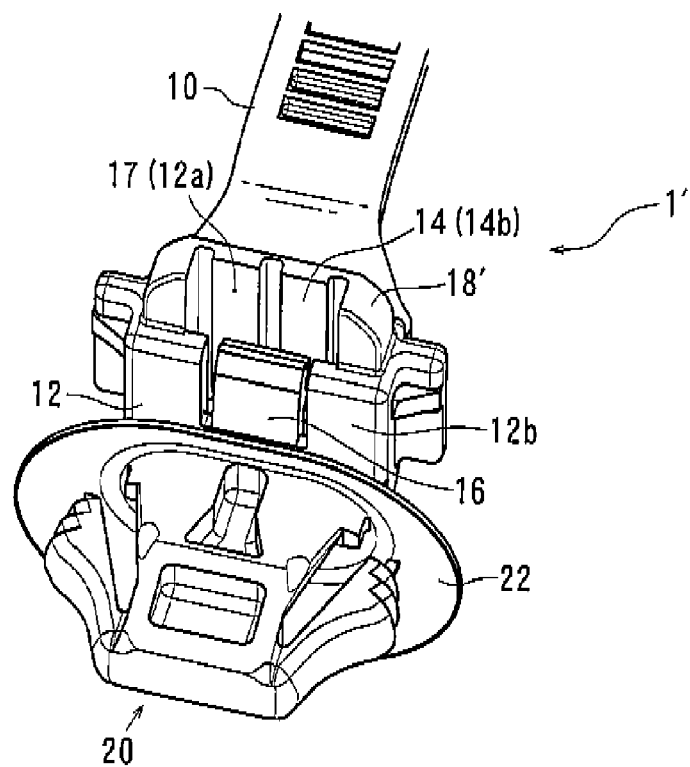
FIG. 6 is a view similar to FIG. 3, which illustrates a fastener according to a second representative embodiment of the present invention.
Figure 7:
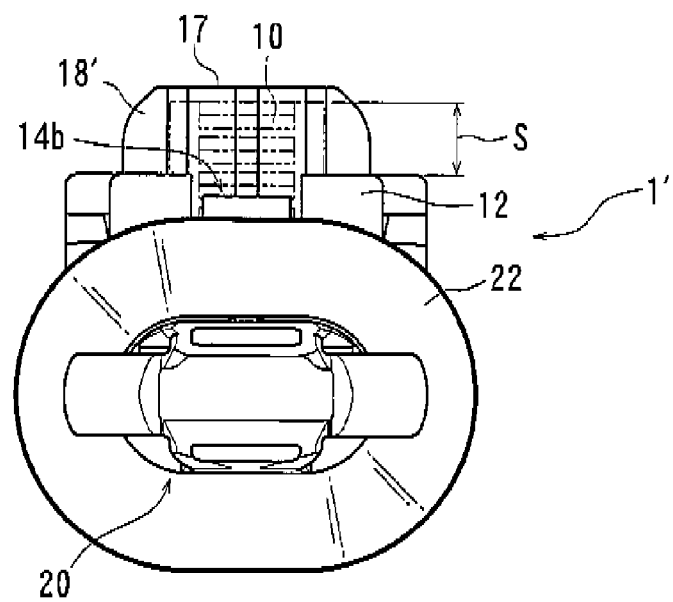
FIG. 7 is an elevational view of a buckle of the fastener.

A second detailed representative embodiment will now be described with reference to FIGS. 6 and 7.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, similar to the first embodiment, the buckle 12 of a fastener 1' may have a pair of protection portions 18'. However, unlike the first embodiment, the protection portions 18' may be connected to each other via a support wall portion 17 that is extended from the back side wall 12a of the buckle 12.

According to the fastener 1' of the present embodiment, the cut end of the remaining portion of the belt 10 can be additionally covered by the support wall portion 17 of the protection portions 18' from back side thereof. Therefore, the worker can further be effectively protected from being injured by the cut end of the belt 10. In addition, the protection portions 18' can be strengthened by the support wall portion 17, so as to have an increased rigidity.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A fastener, comprising;
   a belt,
   a buckle connected to the belt and having an inlet end and an outlet end, the outlet end forming an opening, and
   a pair of protection portions separately formed in the outlet end of the buckle, each of the pair of protection portions extending directly from the outlet of the buckle beyond the opening and being unconnected to the other protection portion beyond the opening of the outlet end,
   wherein the belt and the buckle are arranged and constructed to be locked to each other when the belt is tightened after the belt is inserted into the buckle and drawn from the opening of the outlet end,
   wherein the protection portions are laterally and oppositely positioned across the outlet end so as to respectively guide only longitudinal peripheries of the belt that are inserted into the buckle and drawn from the opening of the outlet end, and
   wherein each of the protection portions has a height greater than a height of an inner surface of the belt that is inserted into the buckle and drawn from the opening of the outlet end, so as to entirely cover each of the longitudinal peripheries of the belt in a height direction.

2. The fastener as defined in claim 1 further comprising an engagement strip formed in the buckle, wherein the engagement strip has engagement projections that are configured to engage the belt inserted into the buckle.

3. A fastener, comprising;
   a belt,
   a buckle connected to the belt and having an inlet end and an outlet end, the outlet end forming an opening,
   a pair of protection portions separately formed in the outlet end of the buckle, each of the pair of protection portions extending directly from the outlet end of the buckle beyond the opening and being unconnected to the other protection portion beyond the opening of the outlet end, and
   an engagement strip formed in the buckle, the engagement strip being positioned between the inlet end and the outlet end of the buckle, so as to not extend beyond the opening of the outlet end,
   wherein the belt and the buckle are arranged and constructed to be locked to each other when the belt is tightened after the belt is inserted into the buckle and drawn from the opening of the outlet end,
   wherein the protection portions are laterally and oppositely positioned across the outlet end so as to respectively guide only longitudinal peripheries of the belt that are inserted into the buckle and drawn from the opening of the outlet end, and wherein each of the protection portions has a height greater than a height of an inner surface of the belt that is inserted into the buckle and drawn from the opening of the outlet end, so as to entirely cover each of the longitudinal peripheries of the belt in a height direction.

4. The fastener as defined in claim 3, wherein the engagement strip has engagement projections that are configured to engage the belt inserted into the buckle.

\* \* \* \* \*